May 26, 1936.     C. J. HALBORG     2,041,759
BROACH
Filed Aug. 4, 1933
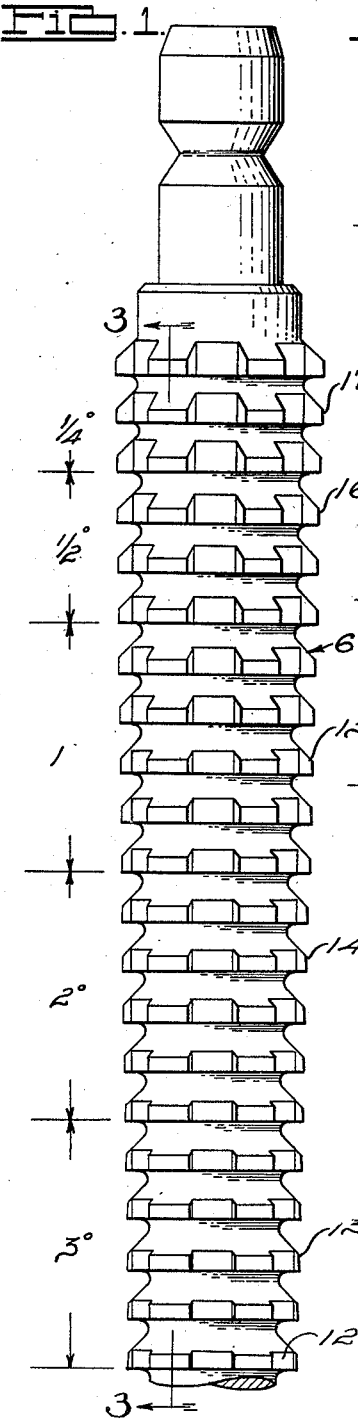
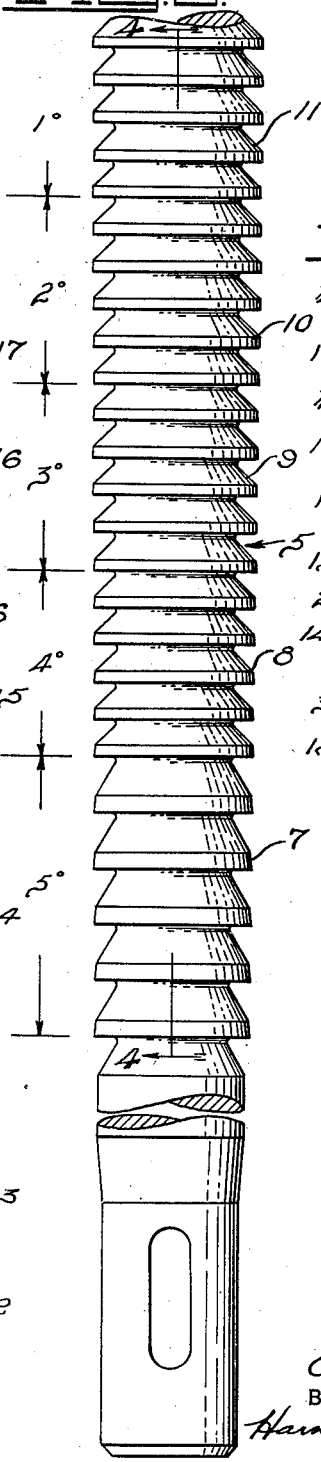
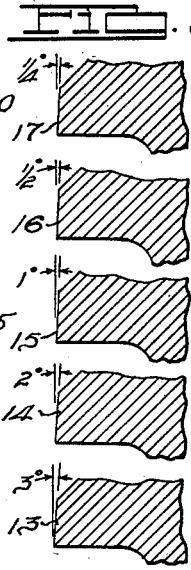
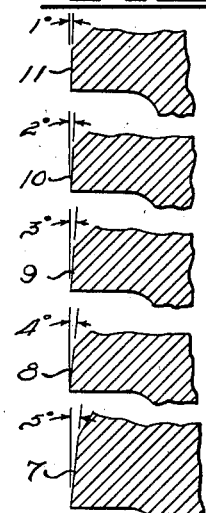
INVENTOR
Carl J. Halborg.
BY
ATTORNEYS.

Patented May 26, 1936

2,041,759

UNITED STATES PATENT OFFICE 2,041,759

BROACH

Carl J. Halborg, Detroit, Mich., assignor to Colonial Broach Company, a corporation of Michigan Application August 4, 1933, Serial No. 683,568

3 Claims. (Cl. 29—95.1)

My invention relates to broaches and particularly to a broach of the spline cutting type wherein the relief on the cutting edges of the teeth are progressively changed from the roughing to the finishing end of the broach to compensate for the variation in the amount of material cut from the work piece by the teeth and to compensate for the machining of the teeth which changes the position of the cutting edges.

While it has been the practice heretofore to reduce somewhat the degree of relief on the finishing portion of a broach, it had been the common practice to provide a land on the finishing teeth which was of increasing width toward the end of the broach. During the sharpening operations if the land was machined away on the front teeth of the finishing group the remaining teeth would still be of the proper diameter to produce the trueing of the land to precise dimensions. While this type of finishing teeth operated fairly successfully, I have found from experiment that by producing a very slight relief to the teeth, better cutting will be provided for the finishing operation and at the same time the sharpening of the teeth will have substantially no effect in changing the dimension of the tooth. Certain wear occurred on the lands before provided and the lands were disposed at a right angle to the cutting edges which was not as efficient for finishing the grooves as the slight relief embodied in the invention of the present application.

In view of the broach being employed on workpieces having apertures therein which are forged, cast, drilled or otherwise formed and which produce a hard uneven surface to be directly machined by the broach teeth, it was found that when only a slight relief was given to the teeth they would wear rapidly and form a flat land which reduced the efficiency of the broach. I have found from experience that by providing a sharp relief to the roughing teeth employed for trueing the hole, cutting was produced which eliminated the wear of the broach teeth which thereby cut into the rough, hard surface to readily machine the material to prepare it for the following teeth which have a reduced relief.

Accordingly, the main objects of my invention are to provide a broach having spline teeth thereon which are relieved in varying amounts from the front to the rear end of the broach; to provide a broach having aperture trueing teeth which are provided with a sharp relief at the front end to provide sharp cutting edges and with progressively decreased relief rearwardly thereof; to provide spline teeth following the aperture trueing teeth which are relieved progressively from the roughing toward the finishing end, the finish portions of which are provided with only a slight relief; to provide a slight relief on the finishing teeth of a broach of such small angle that the sharpening of the front faces of the teeth has very little effect in changing the dimension of the cutting edge; and, in general, to provide a broach which is simple in construction, economical of manufacture and precise in operation.

Other objects and features of novelty of my invention will be either specifically pointed out or will become apparent when referring, for a better understanding of my invention, to the following description taken in conjunction with the accompanying drawing, wherein:

Figure 1 is a view, in elevation, of a spline cutting portion of a broach embodying features of my invention, Fig. 2 is a view, in elevation, of the front portion of the broach illustrated in Fig. 1, showing the aperture trueing portions, Fig. 3 is a broken enlarged sectional view of teeth of the broach illustrated in Fig. 1, and Fig. 4 is a broken enlarged sectional view of teeth of the broach portion illustrated in Fig. 2.

Referring to Figs. 1 and 2, a combination broach is disclosed having two sets of teeth, a trueing set 5, illustrated in Fig. 2, for trueing an aperture to predetermined dimensions after which a section 6 following section 5 is employed for machining splineways in the workpiece. While I have illustrated a straight spline broach, it is to be understood that a spiral or other type of broach can also be embodied with the novel features of my invention which will now be pointed out in detail.

The plurality of teeth of the first section 5 of the broach as illustrated in Fig. 2 are of progressive diameter employed to rough out the aperture in the workpiece and to true it to predetermined dimensions. As illustrated in Fig. 2, the teeth are divided into five different groups from the front or roughing teeth to the final or finishing group of teeth. It will be noted that the teeth in the first group 7 are of greater pitch, that is to say, are positioned farther apart since these teeth will machine the rough surface of the aperture and will thereby produce more chips than the following teeth and the greater spacing is employed for receiving the chips and preventing the broach from clogging. The first set of teeth 7 are marked with a 5 degree angle which, when referring to Fig. 4, is shown to be the angle of relief provided to the cutting edges of the teeth. An adjacent group of teeth 8 are marked 4 degrees which, as illustrated in Fig. 4, will be shown as a 4 degree relief angle to the cutting edge. The next adjacent set of teeth 9 are marked with a 3 degree angle and adjacent thereto a set of teeth 10 are provided with a relief angle of 2 degrees. A finishing set of teeth 11 are marked with a 1 degree angle and it is to be understood that, when desirable, a smaller angle than 1 degree may be applied to some of the aperture finishing teeth.

By providing a large relief angle to the front teeth, greater ease in cutting results which effects the rapid machining of the material and prevents the teeth from wearing flat which eliminates the relief at the cutting edges and tears rather than cuts the material from the wall of the aperture. Upon sharpening the teeth the face moves rearwardly which on the greater angle of relief will change the diameter of the teeth somewhat but, in view of their progressive order, that is to say progressive increase in size, this change will likewise be progressive and in view of the very little relief provided on the finishing teeth the finished diameter will substantially not change. After the broach has had the finish teeth 11 pass through the aperture, it is trued to accurate dimension and ready for the spline teeth to pass therethrough.

The portion 6 of the broach carries the spline teeth projecting from body portions 12 which are the diameter of the finished aperture and therefore provide a bearing for the broach. The spline teeth are of progressively increasing height from the front to the rear of the broach, the first group 13 being provided with a 3 degree relief as illustrated more clearly in Fig. 3. The relief may be less than the relief on the groups of teeth 7 and 8 of the portion 5 since the rough spots have all been machined from the aperture walls. A next adjacent group of teeth 14 are marked with a 2 degree angle while a portion 15 adjacent thereto has a 1 degree angle thereon.

The finishing groups 16 and 17 of the teeth are illustrated as being provided with ½ degree and ¼ degree angle of relief respectively for the purpose of providing relief to the cutting edge and at the same time providing such small relief that the sharpening of the teeth by the grinding of the faces thereof will not materially change the depth of the splineway. Thus a sixteenth of an inch may be dressed off of a tooth having a quarter of a degree angle and still have the broach machine within .0005 of an inch which is within the limit ordinarily specified for a broaching operation. Due to the sharpening of the teeth, the cutting diameters will change greater at the front end of the broach but, since this change in relief is progressive from the front to the rear edge, the change in diameters is likewise progressive so that at the finishing end of the broach substantially no change in diameter will be found after a sharpening operation.

While I have shown the same number of teeth in each of the groups, it is to be understood that they may vary, depending upon the material to be broached, the size of the broach and the type of teeth provided thereon. It will also be understood that the pitch of the teeth may vary depending upon the amount of material to be cut by the teeth, as in group 7 where the teeth operate to cut the rough or high spots from the wall of the aperture and where the pitch is the greatest in view of the chance of having a greater amount of material cut by the teeth.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. A broach comprising two groups of teeth, a group for trueing an aperture to predetermined dimensions, a second group for cutting a splineway in the wall of the aperture, the said trueing teeth being of progressive diameter and of varying pitch and provided in groups having different angles of relief for the cutting edges, the spline cutting teeth likewise being of progressive height and provided in groups having different angles of relief, the teeth of the finishing portion being of the same height but varying in relief angle to the cutting edges which are less than the relief angles on the roughing teeth of the spline broach portion.

2. A broach provided with a portion for trueing an aperture to predetermined diameter and a spline cutting portion, the group of teeth in the aperture trueing portion being of progressive diameter having groups of teeth which vary from 1 to 5 degrees in relief angle to the cutting edges, the relief on the finishing cutting edges being less than 1 degree, spline teeth following said first teeth which are likewise of increased height and which vary in relief angle from 3 to 1 degrees and finishing spline teeth following the spline cutting group which are of equal height and are provided with a relief angle which is less than 1 degree.

3. A broach for progressively machining and finishing a work element having a body provided with a plurality of teeth of progressively increasing height from the front toward the rear thereof and constituting the rough cutting portion of the broach, a plurality of teeth of substantially equal height disposed rearwardly of the roughing teeth and constituting the finishing teeth of the broach, all of said teeth being angularly relieved at the top to form sharp cutting edges, the angle of relief on the roughing teeth being greater than the angle of relief of the finishing teeth, the angle of at least some of which is less than one degree.

CARL J. HALBORG.